United States Patent
Koch et al.

(10) Patent No.: US 7,853,684 B2
(45) Date of Patent: Dec. 14, 2010

(54) SYSTEM AND METHOD FOR PROCESSING WEB ACTIVITY DATA

(75) Inventors: Donald O. Koch, Apex, NC (US); Thomas E. Grant, Jr., Ashland, VA (US)

(73) Assignee: SAS Institute Inc., Cary, NC (US)

( * ) Notice: Subject to any disclaimer, the term of this patent is extended or adjusted under 35 U.S.C. 154(b) by 1855 days.

(21) Appl. No.: 10/271,340

(22) Filed: Oct. 15, 2002

(65) Prior Publication Data

US 2004/0073644 A1  Apr. 15, 2004

(51) Int. Cl.
G06F 15/16 (2006.01)
G06F 7/00 (2006.01)

(52) U.S. Cl. .................... 709/224; 709/217; 707/749; 707/736; 707/759

(58) Field of Classification Search .............. 709/201, 709/202, 203, 223, 224, 217; 707/749, 736, 707/759

See application file for complete search history.

(56) References Cited

U.S. PATENT DOCUMENTS

| | | | | |
|---|---|---|---|---|
| 4,870,579 A * | 9/1989 | Hey | .......... | 705/27 |
| 4,996,642 A * | 2/1991 | Hey | .......... | 705/27 |
| 5,235,509 A * | 8/1993 | Mueller et al. | .......... | 705/15 |
| 5,892,917 A * | 4/1999 | Myerson | .......... | 709/224 |
| 6,018,619 A * | 1/2000 | Allard et al. | .......... | 709/224 |
| 6,076,108 A * | 6/2000 | Courts et al. | .......... | 709/227 |
| 6,112,238 A * | 8/2000 | Boyd et al. | .......... | 709/224 |
| 6,175,838 B1 * | 1/2001 | Papierniak et al. | .......... | 707/203 |
| 6,182,097 B1 * | 1/2001 | Hansen et al. | .......... | 715/234 |
| 6,314,406 B1 * | 11/2001 | O'Hagan et al. | .......... | 705/14 |
| 6,317,787 B1 * | 11/2001 | Boyd et al. | .......... | 709/224 |
| 6,338,066 B1 * | 1/2002 | Martin et al. | .......... | 707/10 |
| 6,393,479 B1 * | 5/2002 | Glommen et al. | .......... | 709/224 |
| 6,466,970 B1 * | 10/2002 | Lee et al. | .......... | 709/217 |
| 6,480,894 B1 * | 11/2002 | Courts et al. | .......... | 709/227 |
| 6,549,944 B1 * | 4/2003 | Weinberg et al. | .......... | 709/224 |
| 6,578,078 B1 * | 6/2003 | Smith et al. | .......... | 709/224 |
| 6,615,247 B1 * | 9/2003 | Murphy | .......... | 709/217 |
| 6,718,372 B1 * | 4/2004 | Bober | .......... | 709/217 |
| 6,789,115 B1 * | 9/2004 | Singer et al. | .......... | 709/224 |
| 6,792,458 B1 * | 9/2004 | Muret et al. | .......... | 709/224 |
| 6,836,773 B2 * | 12/2004 | Tamayo et al. | .......... | 707/6 |
| 6,845,372 B2 * | 1/2005 | Bates et al. | .......... | 707/3 |
| 6,850,944 B1 * | 2/2005 | MacCall et al. | .......... | 707/100 |
| 6,853,982 B2 * | 2/2005 | Smith et al. | .......... | 705/27 |

(Continued)

OTHER PUBLICATIONS

Sean Nicholson, Dreamweaver: Creating Visitor Accounts Through Username Validation May 17, 2002, pp. 1-21.*

*Primary Examiner*—Kevin Bates
(74) *Attorney, Agent, or Firm*—Jones Day

(57) ABSTRACT

A computer-implemented system and method for analyzing user browsing activity. Records from a web log that were generated during web browsing sessions are accessed. The web log includes at least one record that is detached from other records generated during the same browsing session as the one record. A web log data characteristic of the detached session record is compared with a web log data characteristic of other records in the web log. Based upon the comparison, the detached session record is associated with at least another record from the web log. The association between the detached session record and the another record is used to analyze user browsing activity.

33 Claims, 10 Drawing Sheets

U.S. PATENT DOCUMENTS

| | | | |
|---|---|---|---|
| 6,883,032 B1 * | 4/2005 | Dempski | 709/229 |
| 6,925,442 B1 * | 8/2005 | Shapira et al. | 705/10 |
| 6,957,390 B2 * | 10/2005 | Tamir et al. | 715/744 |
| 6,983,379 B1 * | 1/2006 | Spalink et al. | 705/10 |
| 6,996,536 B1 * | 2/2006 | Cofino et al. | 705/26 |
| 7,003,565 B2 * | 2/2006 | Hind et al. | 709/224 |
| 7,032,017 B2 * | 4/2006 | Chow et al. | 709/223 |
| 7,216,149 B1 * | 5/2007 | Briscoe et al. | 709/217 |
| 7,349,827 B1 * | 3/2008 | Heller et al. | 702/186 |
| 7,464,187 B2 * | 12/2008 | Glommen et al. | 709/250 |
| 7,469,341 B2 * | 12/2008 | Edgett et al. | 713/176 |
| 7,562,387 B2 * | 7/2009 | Nguyen et al. | 726/22 |
| 2002/0021665 A1 * | 2/2002 | Bhagavath et al. | 370/229 |
| 2002/0062223 A1 * | 5/2002 | Waugh | 705/1 |
| 2002/0078141 A1 * | 6/2002 | Cohen et al. | 709/203 |
| 2002/0087679 A1 * | 7/2002 | Pulley et al. | 709/224 |
| 2002/0178169 A1 * | 11/2002 | Nair et al. | 707/100 |
| 2003/0033155 A1 * | 2/2003 | Peerson et al. | 705/1 |
| 2003/0208594 A1 * | 11/2003 | Muret et al. | 709/224 |

* cited by examiner

250 — GET / - http://search.msn.com/

260 — GET /css/style.asp SITESERVER=ID=39f....http://www.vcs.com/

270 — GET /search.asp SITESERVER=ID=39f....http://www.vcs.com/

Fig. 7

| Acquisition | De-headed Sessions | Re-Headed Sessions |
|---|---|---|
| Advertising Expense | $12,523 | $12,523 |
| Click-Through | 4,236 | 4,236 |
| Buyers | 7 | 452 |
| Initial Sales | $363 | $23,432 |
| Initial Profit on Sales | $127 | $8,201 |
| 6-Month Follow-up Campaign | De-headed Sessions | Re-Headed Sessions |
| Advertising Expense | $17 | $1,130 |
| Multi-Buyers | 3 | 293 |
| Sales | $182 | $35,453 |
| Profit on Sales | $63 | $12,408 |
| Summary | De-headed Sessions | Re-Headed Sessions |
| Total Profit on Sales | $190 | $20,610 |
| Total Advertising Expense | $12,540 | $13,653 |
| Lifetime Value | ($12,349) | $6,956 |

Fig. 9

SYSTEM AND METHOD FOR PROCESSING WEB ACTIVITY DATA

BACKGROUND

1. Technical Field

The present invention is generally directed to computer-implemented data processing, and more specifically to processing of user internet-related activity data.

2. Description of the Related Art

With the explosion of data produced by internet-related commerce, on-line retailers and other website owners have been able to collect large amounts of information about customer browsing activity. However, knowledge gaps about a customer's browsing activity appear due to inefficient ways in which customer web browsing activity is tracked.

SUMMARY

In accordance with the teachings disclosed herein, a computer-implemented system and method are provided for analyzing user browsing activity. Records from a web log that were generated during web browsing sessions are accessed. The web log includes at least one record that is detached from other records generated during the same browsing session as the one record. A web log data characteristic of the detached session record is compared with a web log data characteristic of other records in the web log. Based upon the comparison, the detached session record is associated with at least another record from the web log. The association between the detached session record and the another record is used to analyze user browsing activity.

BRIEF DESCRIPTION OF THE DRAWINGS

The present invention satisfies the general needs noted above and provides many advantages, as will become apparent from the following description when read in conjunction with the accompanying drawings, wherein:

FIG. 7 shows an excerpt from a web log created based upon the session activity shown in FIG. 6;

FIG. 9 is a table comparing de-headed session analysis results with re-headed session analysis results.

DETAILED DESCRIPTION

Figure 1:
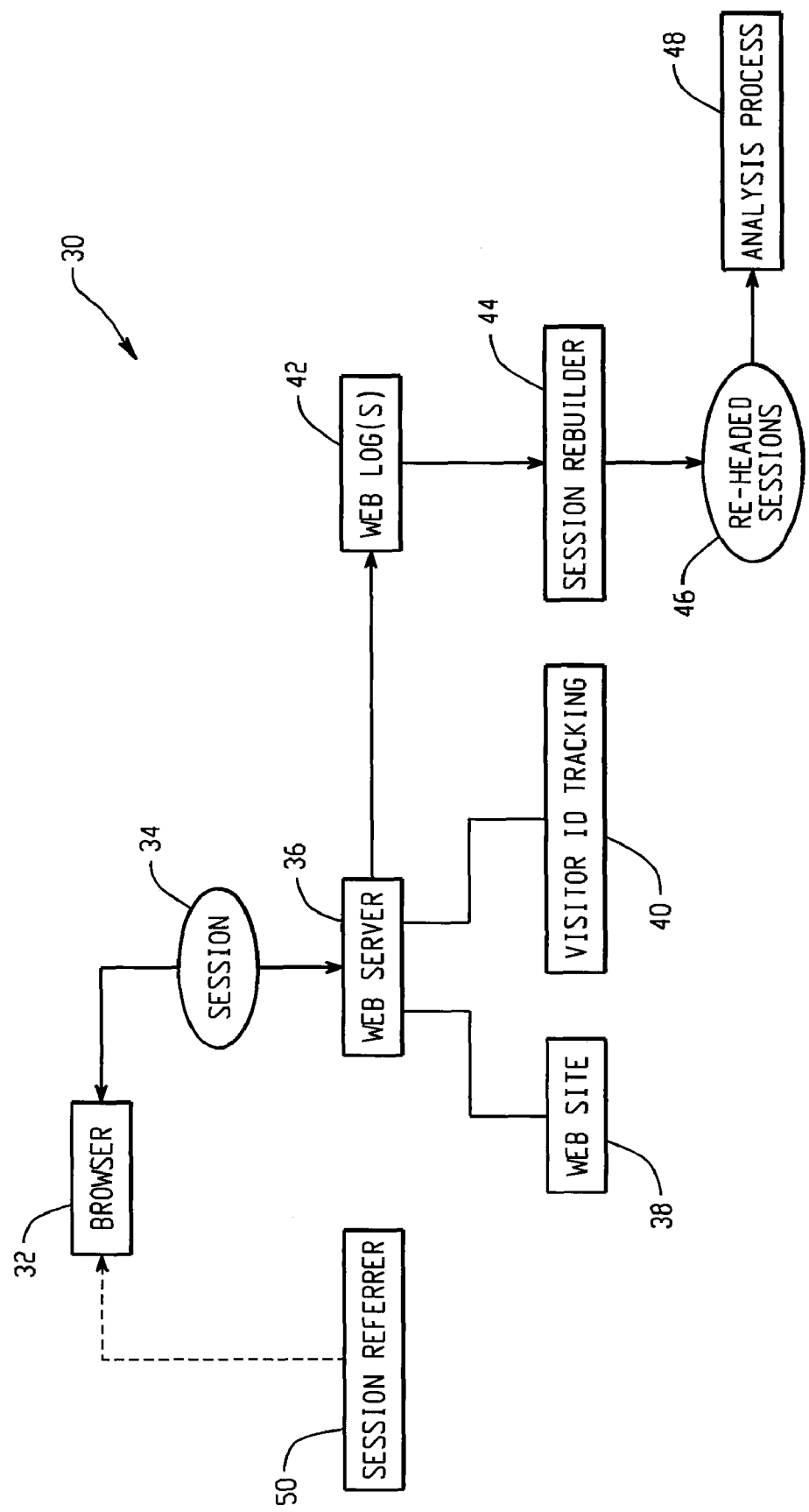
FIG. 1 is a block diagram depicting a computer-implemented system for reattaching session activity records.

FIG. 1 depicts a computer-implemented system 30 that analyzes web browser session activity on a web site 38. A session rebuilder 44 uses browser activity data to reattach browser session record(s) that are detached from other records that were generated from that session. A browser session record may become detached when the session record is written to a web log 42 without visitor tracking data being available for the record.

Typically during a session, a web browser 32 provides requests to a web server 36 to access content of a web site 38. A web browser 32 is said to be in a session 34 with a web server 36 when it is executing a set of requests to the web server 36. During a normal session 34 all requests are logically related. For example, the browser 32 of a person searching for a book may make hundreds of requests to the web server 36, and the person may conclude the session 34 with the purchase of a book. Each of these requests and the ultimate transaction of the session are recorded in a web log 42.

A web log 42 is an electronic record of browser activities of a particular website 38 recorded by the web server 36. Each browser 32 of a website 38 is assigned an electronic visitor identifier 40 that permits the web server 36 to record the pages and links that a browser 32 takes. Website owners and advertisers are interested in using visitor identification information 40 to ascertain where on the internet the web browser 32 was prior to the first request of a session 34 kept in the web log 42. This information is stored in the web log 42 as the referrer. The referrer of the first request of a session is called the session referrer 50. This piece of information is used in designing websites, paying advertisers, paying referring sites and in many other ways.

Unfortunately, the session referrer 50 is often lost because visitor identification information 40 is not recorded in the web log 42 until after the first browser request and by then the session referrer 50 is typically gone. In other words, when reviewing web logs 42, sessions 34 often appear to be self-referred (i.e., they appear to have been referred by the very site they are visiting), and many sessions 34 referred from other web sites appear to end after the first request.

The session rebuilder 44 identifies and reattaches to the session's other records the lost session referrer 50. The session rebuilder 44 outputs its re-headed session data 46 so that an analysis process 48 may be performed upon the output 46. The session rebuilder 44 and the analysis process 48 may be used in many situations, such as the following. Consider an online book retailer that launches a new banner-ad campaign. A portion of those who click on the ad will be first-time users of the website. They may purchase a book. Through analysis process 48 of the re-headed session data 46, the retailer and others have a way of knowing which sites are their best advertisers, and the affiliate site that carried the banner will get proper credit for a purchase.

Figure 2:
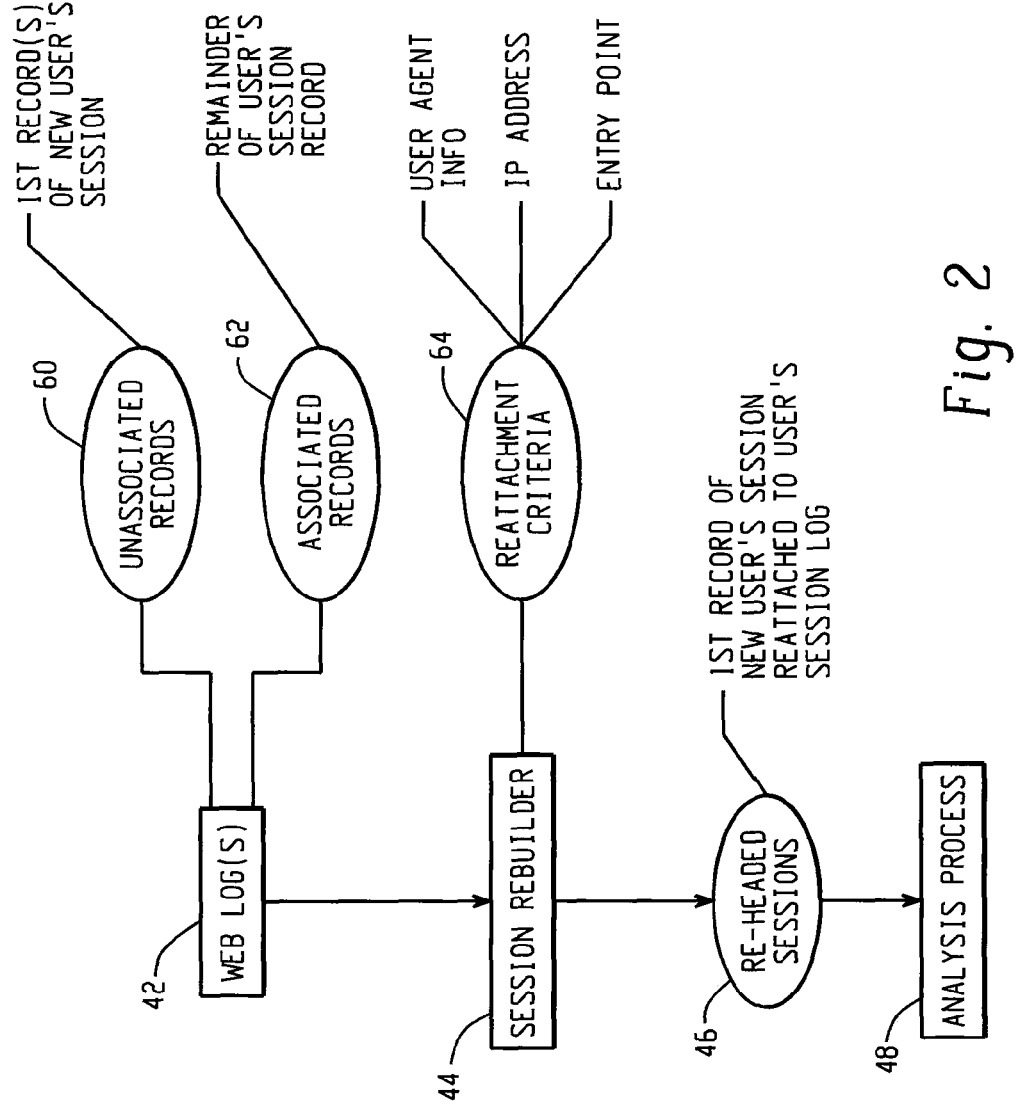
FIGS. 2 and 3 are block diagrams showing a session rebuilder reattaching session records from a web log.

FIG. 2 shows a session rebuilder 44 reattaching "lost" session records 60 from a web log 42 to other records from the session. The web log 42 contains session records 62 that have proper visitor identifications which allow the session records 62 to be grouped together based upon visitor identification information. Visitor identification information typically entails a string that is used to identify a unique browser (i.e. single visitor). For example, the visitor identification information may include what is commonly referred to as "cookie" information, but may include among other things attaching a visitor or session ID to the query string of every request to uniquely identify a browser (e.g., "GET/basket.html?sessionID=2434").

In addition to associated records 62, the web log 42 also contains visitor session records 60 that do not have proper visitor identification information. Without proper visitor identification information, these session records 60 cannot be grouped with other session records and thus cannot be used to provide a more complete assessment of a user's browser activity. A record 60 may become detached from its other session records due to the record being the first record of a new user's session and the visitor identification information is not yet available to be used with the record.

The session rebuilder 44 uses one or more criteria 64 to reattach the unassociated records 60 with the remainder of the users' session records 62. The reattachment criteria 64 focuses upon certain data characteristics of the web log 42 to discern which records (60 and 62) are associated. As an illustration, the user agent data field from the web log 42 may be used in the session rebuilding process. The user agent data field contains a visitor's browser software version string that is passed on to the web server with each request. These strings indicate the browser version, host platform operating system, and any third-party customizations made to the browser. Records (60 and 62) having the same user agent string exhibit a greater likelihood of being related and thus associated.

Another reattachment criterion 64 that the session builder 44 may use to group unassociated records 60 with other session records 62 includes the browser's Internet Protocol (IP) address. This includes the TCP/IP address (network id) of the machine that the browser is running on as it appears to the web server. It is noted that a web server may not see the true IP address of the browser machine if the browser request travels through one or more proxy or caching servers on its way to the web server. In this case the IP address will appear to be that of the last intervening machine. Records (60 and 62) having the same IP address exhibit a greater likelihood of being related and thus associated.

The visitor's entry point onto the website may be used as an reattachment criterion 64. Typically, any page on the website may be considered a logical entry point. This can be for example the site's "home" page or a page given in an advertisement.

Figure 3:
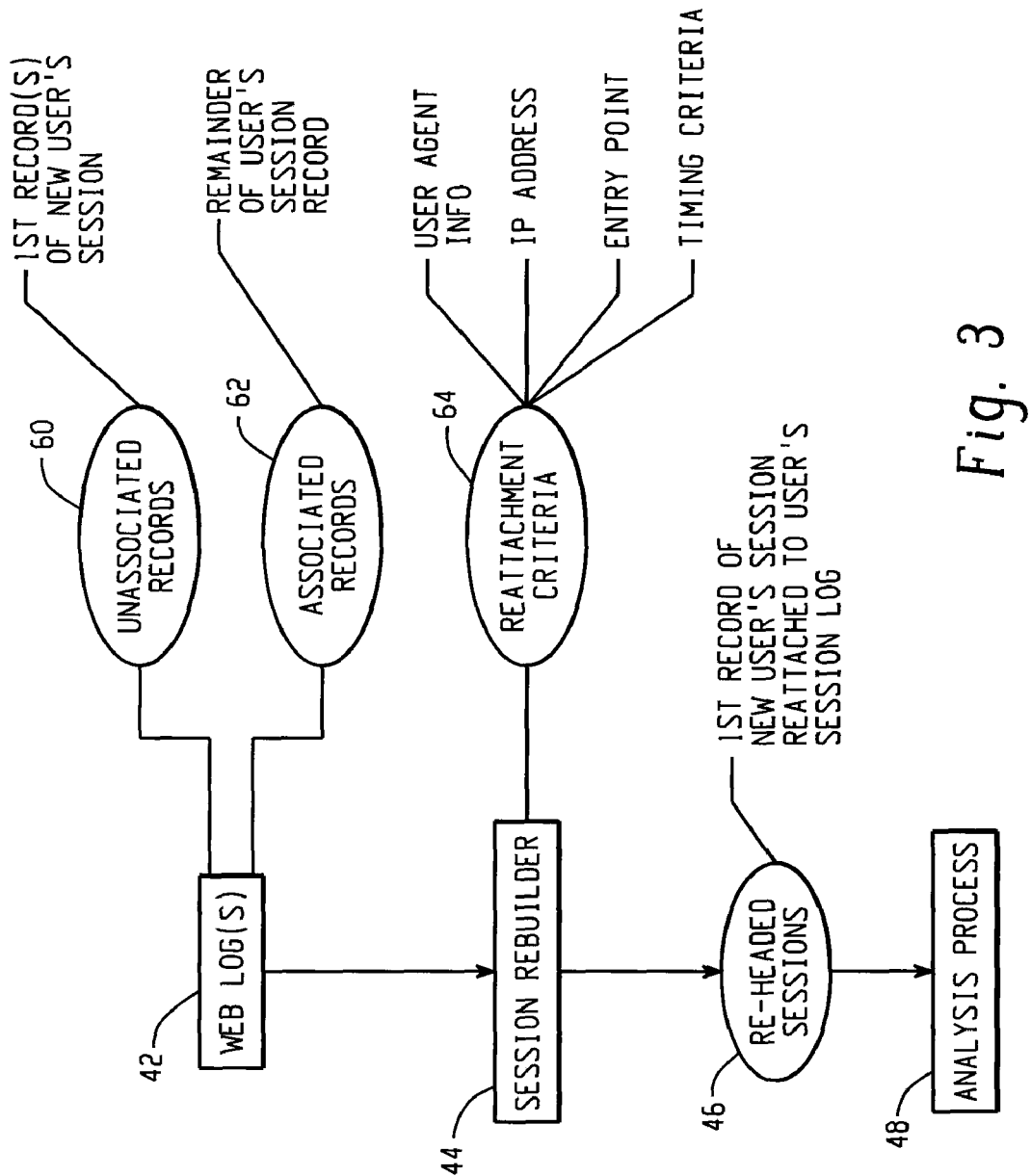

It should be understood that additional reattachment criteria 64 may be used to enhance the likelihood that records are related and thus should be reattached. For example, FIG. 3 illustrates that timing criteria may be used to further hone the rebuilding process. Records having time stamps substantially proximate in time and in a proper chronological order exhibit a greater likelihood of being related and thus associated. It is noted that the number of criteria used in reattaching session records varies depending upon the desired degree of reattachment accuracy.

Figure 4:
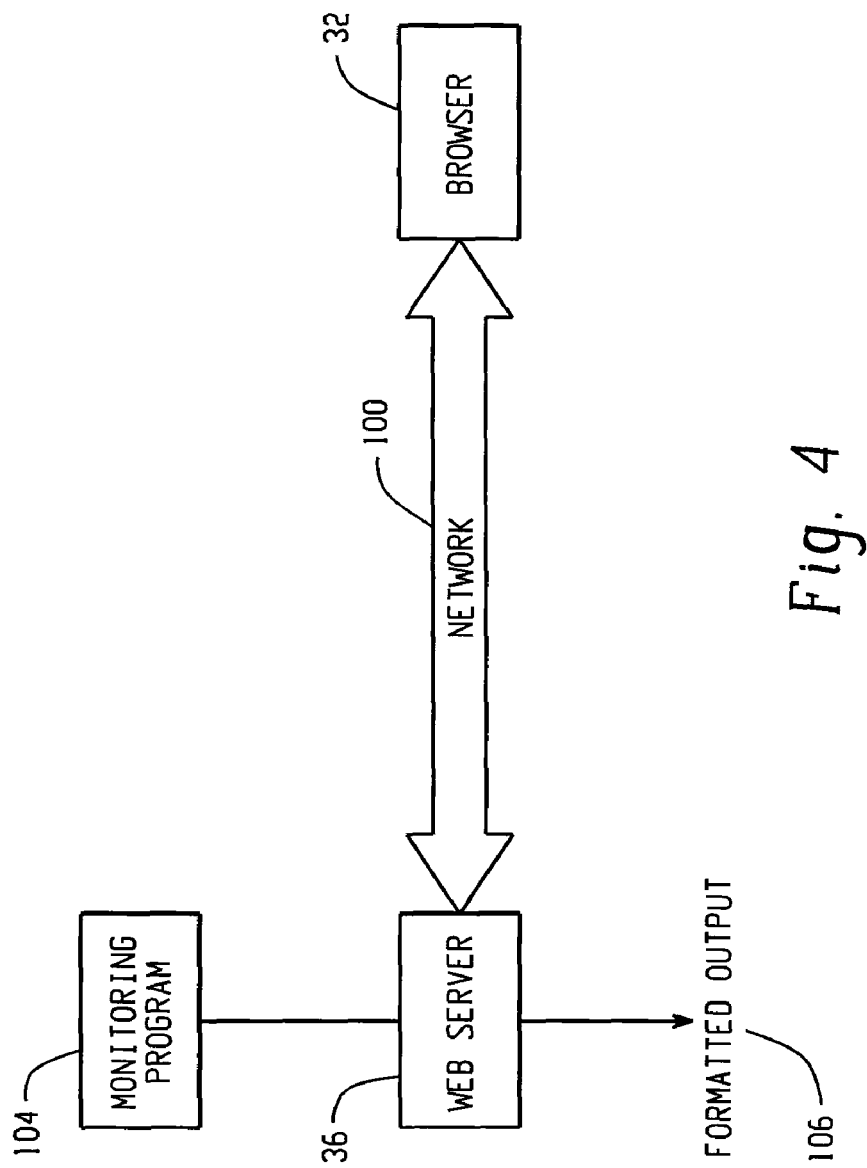
FIG. 4 is a block diagram illustrating a scenario within which browser-server session data is obtained.

FIG. 4 illustrates a scenario within which browser-server session data is obtained. A browser 32 and a web server 36 are shown communicating over a network 100, such as the internet, a wide area network or a local area network. A monitoring program 104 (as may be available on an Apache web server or other similar type program that is commercially available) record and monitor requests from the browser 32 (as well as other network data). On the web, these requests take the form of hypertext transfer protocol (HTTP) requests. A monitor program 104 can detect characteristics of the requesting client, and this information is outputted as formatted output 106 for inclusion into a web log.

Figure 5:
FIG. 5 is a table showing examples of the type of output that may be placed in a web log.

The content of the formatted output 106 may vary based upon the monitoring programs used. FIG. 5 provides examples of the content that the formatted output 106 may resemble in a web log:

The date-time field which contains the date and time that record was created.

The IP address field which signifies the IP address of the client (or last intervening server). This may be a numeric IP address or a resolved domain name.

The method field which signifies the HTTP method used to access the web server. This may be POST, GET, or other valid HTTP method names.

The uniform resource identifier (URI) stem field which signifies the directory the client seeks to access.

The URI query field which signifies the query, if any, that the client seeks to perform. This may include one or more search strings for which the client seeks a match.

The cookie field which shows a cookie's content where supplied.

The user name field which signifies the client side (cs) username associated with the logged in account if available. Typically, an anonymous access will result in a missing indicator.

The referrer field which signifies a referring uniform resource locator (URL) when it is known. The table of FIG. 5 shows that the referrer in this example was the http://www.google.com site; this may have arisen due to the user conducting a search on the www.google.com web site, and the search results contained a hyperlink to another website.

The user agent field which signifies the value supplied by a client's web browser to identify the user agent. The field usually indicates the browser version, host platform operating system, and any third-party customizations made to the browser.

The status field which signifies the server-side HTTP status code for the results of the requested operation and usually shows a numeric value of "200" for a successful operation.

The bytes field which signifies the number of bytes transferred from client to server to state the client's request.

Figure 6:
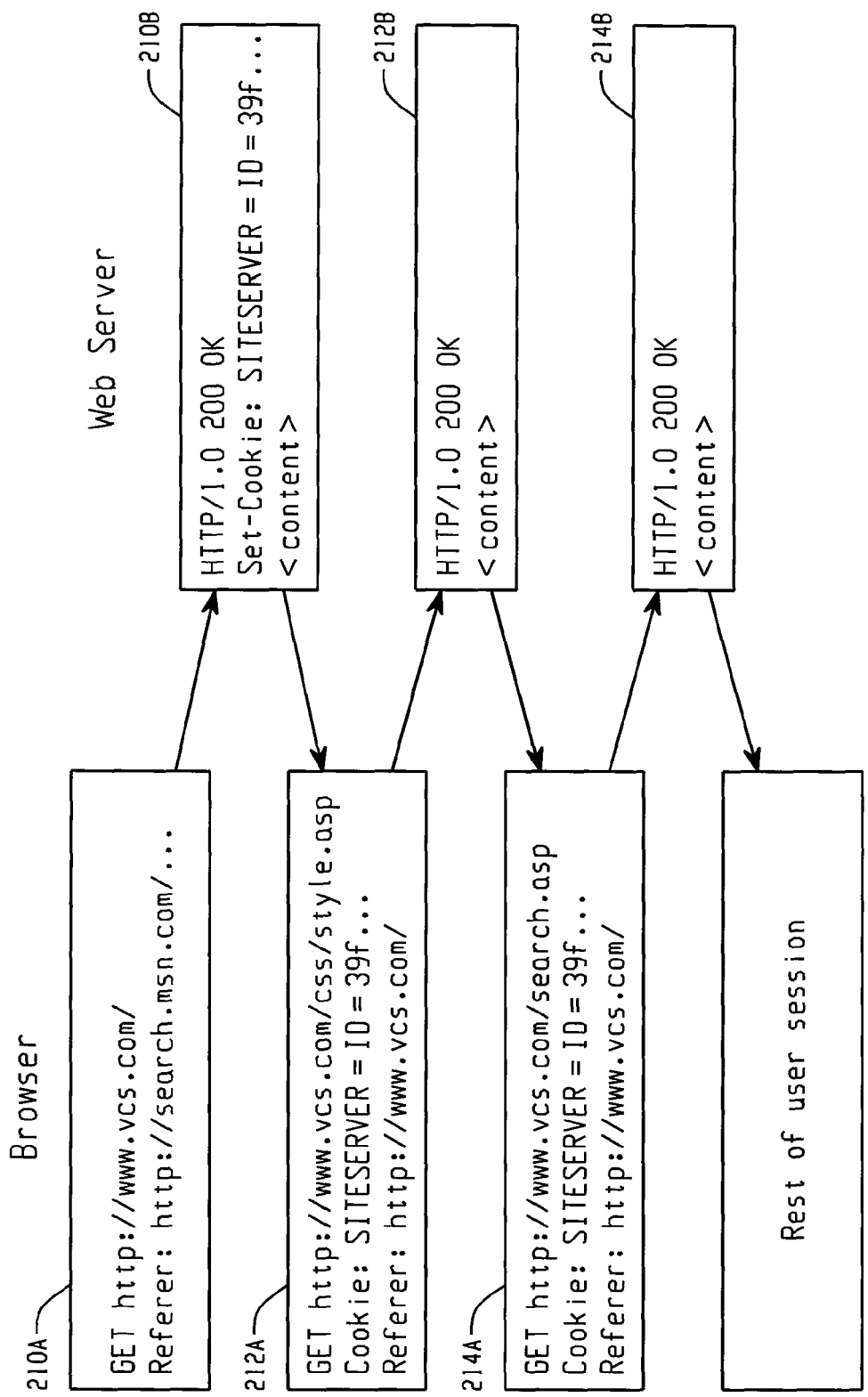
FIG. 6 is a block diagram illustrating an exemplary request-response exchange between a browser and a web server.

FIG. 6 illustrates an exemplary request-response exchange between a browser and a web server. In this example, the browser has conducted a search through the Microsoft® network website (i.e., www.msn.com). As part of its search results, the www.msn.com website produced a link to another website (i.e., www.vcs.com). After the user activates the link, the browser issues request 210A that contains a GET command. The GET command is used to obtain an initial web page from the http://www.vcs.com/ website (i.e., an entry web page). The referrer is furnished in the request 210A and has a value of "http://search.msn.com/". Request 210A contains other data fields that are not shown, such as user agent and IP address.

The web server provides response 210B to the browser's request 210A. The web server's response 210B provides (in addition to web page content) a visitor identification to track the user's remaining session activities. The browser's next requests (212A and 214A) contain the visitor identification provided by the web server. The web server provides response 212B to request 212A, and response 214B to request 214A.

FIG. 7 shows an excerpt from the web log created based upon the session activity shown in FIG. 6. The following four fields are shown in the session web log of FIG. 7: method, URI stem, cookie, and referrer. (It should be understood that a web log typically contains more fields than shown in FIG. 7). The browser request 210A of FIG. 6 generated web log record 250 of FIG. 7 and has the following web log field values:

method: "GET"
URI stem: "/"
cookie: "-" (i.e., missing)
referrer: "http://search.msn.com/"

The browser request 212A of FIG. 6 generated web log record 260 of FIG. 7 and has the following web log field values:

method: "GET"
URI stem: "/css/style.asp"
cookie: "SITESERVER=ID=39f . . . "

referrer: "http://www.vcs.com/"

The browser request 214A of FIG. 6 generated web log record 270 of FIG. 7 and has the following web log field values:

method: "GET"
URI stem: "/search.asp"
cookie: "SITESERVER=ID=39f . . ."
referrer: "http://www.vcs.com/"

Although part of the session, record 250 is unassociated with records 260 and 270 in the web log because it lacks a cookie value. The web log characteristics of the records (250, 260, 270) are used to reattach record 250 with one or more other session records (260 and 270).

Figure 8:
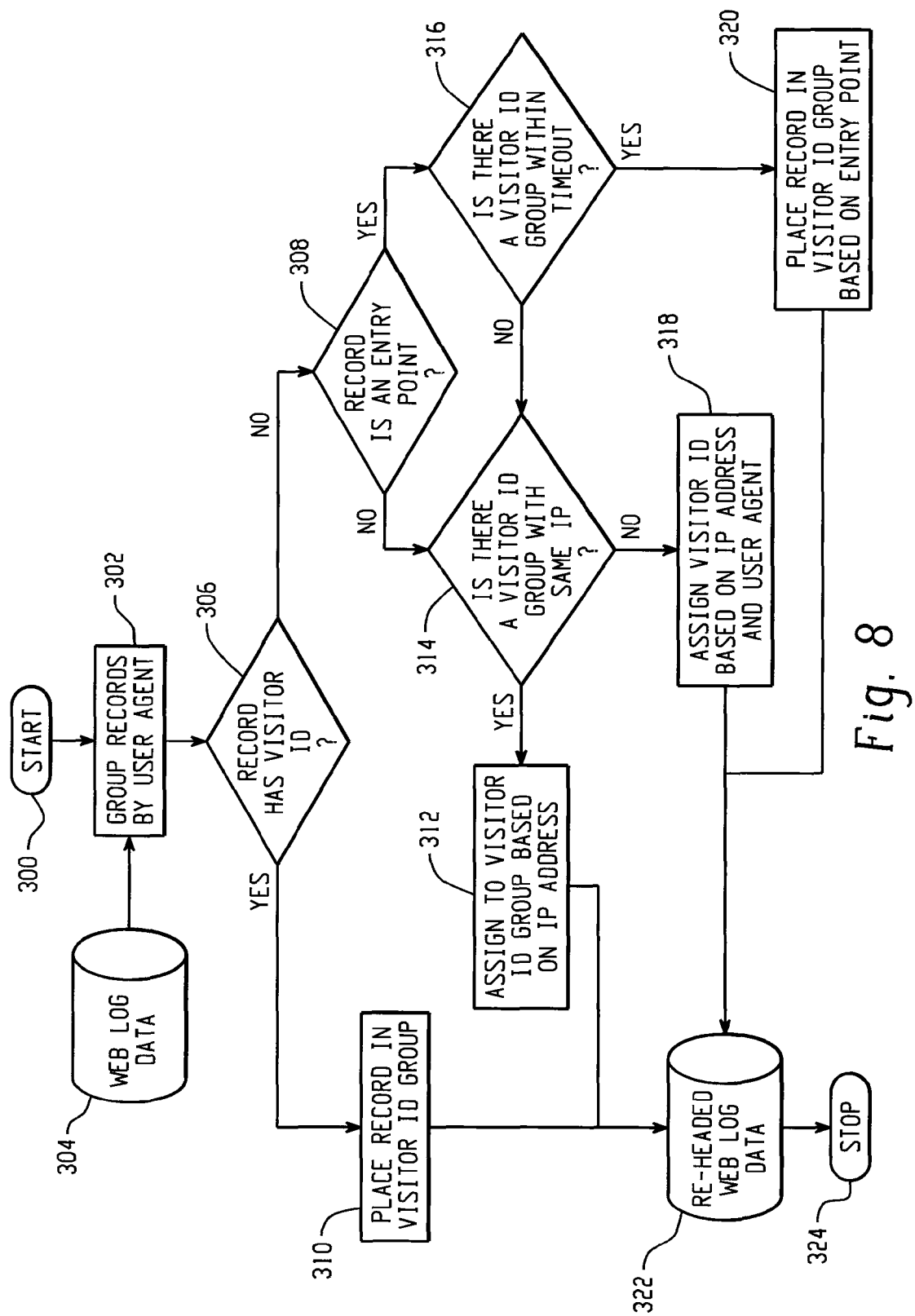
FIG. 8 is a flowchart depicting operational steps for grouping session records.

The flowchart of FIG. 8 depicts a process for rebuilding a session via reattachment criteria. With reference to FIG. 8, the process starts at start block 300. Process block 302 accepts as input unprocessed web log(s) from database 304 and groups the individual records by user agent. Because user agent is assumed constant for a browser, grouping by user agent ensures that all of the records from a single browser will be kept together.

Decision block 306 determines whether each record within a user agent group has a visitor ID (e.g., as may be stored in a cookie) and groups records by visitor ID. If a record has a visitor ID, then control passes to process block 310 wherein the record is placed in the visitor ID group and then stored in the re-headed web log data 322.

If a record does not have a visitor ID, then control passes to decision block 308 which determines whether the record is an entry page. If a record is an entry point, the decision block 316 examines whether a visitor ID group is within a predetermined timeout threshold. If it is, then process block 320 places the record in the visitor ID group based on the entry point. In other words, entry pages are given visitor ID group membership in the visitor ID group which has an earliest timestamp closest to but greater than the timestamp of the entry page. In such a situation, it may be assumed that the entry page was detached from its true visitor ID group because its visitor ID cookie was not yet logged in the web server log so the reattachment process finds the visitor ID group that occurred immediately after the entry page.

If an appropriate visitor ID group cannot be found by decision block 316 within a set time-out period (e.g., it is too remote in time) then that record is passed on to decision block 314 to determine if it can be assigned a visitor ID based on IP address by process block 312. If decision block 314 determines that there is not a visitor ID group with the same IP address, then process block 318 assigns to the record a visitor ID that is a concatenation of IP address and user agent. At this point the records have a visitor ID and are written to the re-headed web log database 322. Processing terminates at stop block 324.

It should be understood that the steps shown in FIG. 8 are exemplary and may be modified, such as with respect to processing order, to achieve substantially the same result. Additional steps may also be performed, such as discarding session records of relative little importance. This may include discarding GET requests to low level web page objects (e.g., JPEG images). Still further, parameter values used in the process may be varied to suit the situation at hand, such as varying the timeout value of decision block 316.

FIG. 9 shows at 360 a comparison of de-headed session analysis results with re-headed session analysis results. The analysis results generated for the de-headed original web log is shown in column 362. The analysis results generated for the re-headed web log is shown in column 364. The session rebuilt analysis results of column 364 more accurately reflect the web browsing activities for the web site due to its inclusion of reattached session data. For example, column 364 shows that the number of buyers that were referred from a web site was actually 452 rather than 7 as shown in column 362. Due to recognition of these additional referrals, the referring site is entitled to a greater amount of revenue from the "referred to" web site. Additionally, the "referred to" web site can better evaluate the effectiveness of its advertising campaign, such as its selection of advertisers.

Figure 10:
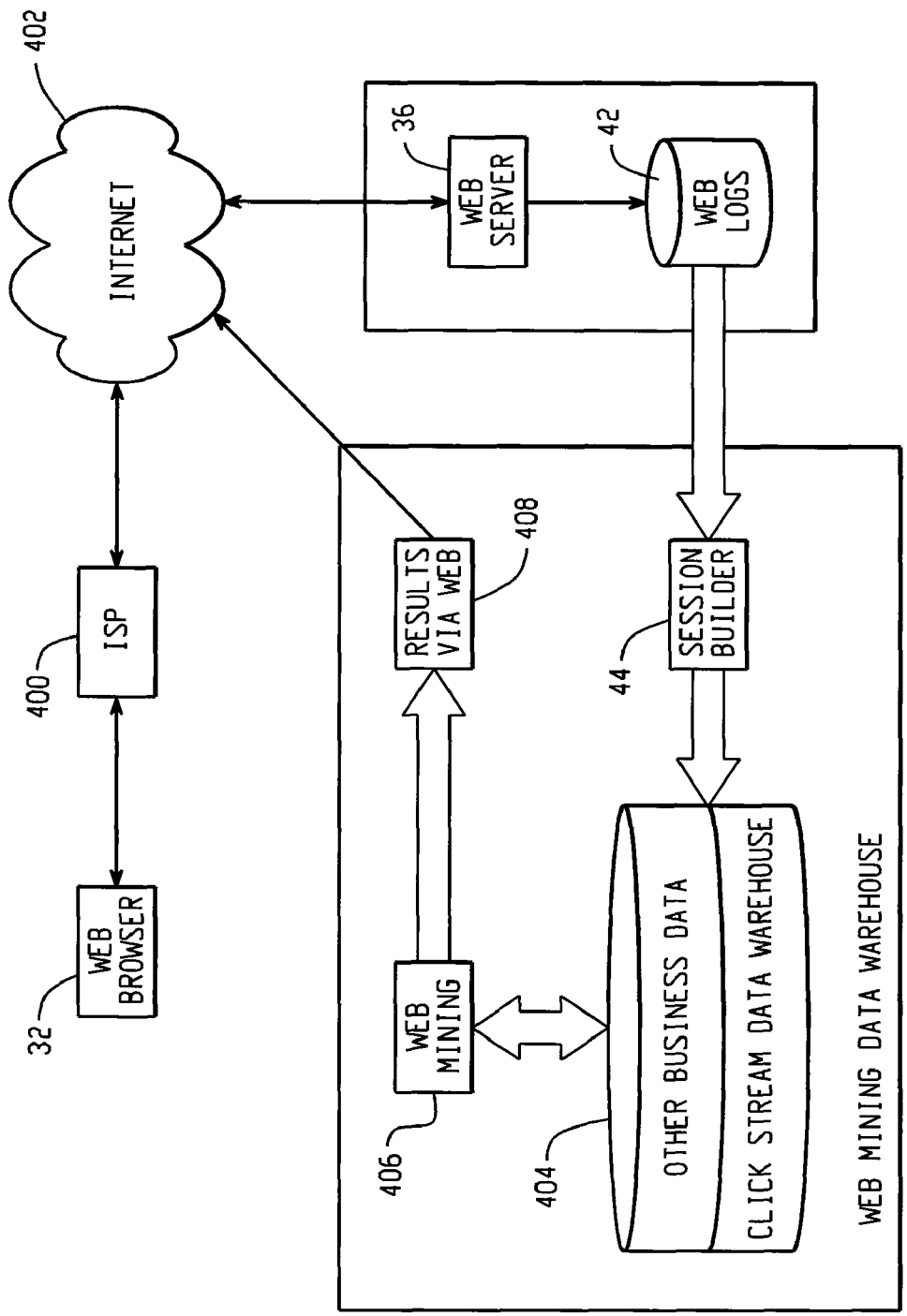
FIG. 10 is a block diagram illustrating the use of the reattachment system with other systems.

While examples have been used to disclose the invention, including the best mode, and also to enable any person skilled in the art to make and use the invention, the patentable scope of the invention is defined by the claims, and may include other examples that occur to those skilled in the art. For example, FIG. 10 shows the reattachment system's diverse capability in interfacing with databases, data miners, and other types of systems. With reference to FIG. 10, a web browser 32 may use an internet service provider 400 to access a web server 36 located on the internet 402. The web server records the browser-server session in a web log 42. The session data in the web log 42 is reconstructed using the session builder 44 and is provided to a web mining data warehouse 404. The click stream session data from the session builder 44 is analyzed in conjunction with other business data by a web mining application 406. The analytical results 406 from the web mining application 406 may then be accessed through the internet. As an illustration, a web mining application 406 (such as Enterprise Minder™ from SAS Institute Inc. located in North Carolina) may analyze the reattached session data with respect to other business data that may include sales data, ad campaign data, product catalog data, and/or customer data.

As further examples of the wide scope of the invention, many different types of servers may be used within the reattachment system, such as web page servers, caching servers, secure servers, application servers, and media servers.

It is claimed as the invention:

1. A method for analyzing browsing activity, comprising:
    generating, using one or more processors, one or more records during a browsing session, each record having corresponding cookie data;
    placing the one or more records and the corresponding cookie data from the browsing session into a web log, wherein cookie data corresponding to at least one record is not placed into the web log;
    grouping the one or more records in the web log, wherein each group is associated with cookie data corresponding to records generated during a particular browsing session;
    determining that the record without corresponding cookie data was generated during a particular browsing session and has been detached from other records with corresponding cookie data generated during the particular browsing session, wherein the other records form a group of session records associated with the particular browsing session and the detached session record is not included in the group of session records associated with the particular browsing session;
    determining that the detached session record is associated with the particular browsing session by comparing a web log data characteristic of the detached session record with a web log data characteristic of at least one record in the group of session records in the web log that are associated with the particular browsing session;
    including the detached session record in the group of session records associated with the particular browsing session based upon the comparison; and using the association between the detached session record and the particular browsing session to analyze browsing activity.

2. The method of claim 1, wherein browsing activity includes one or more browser requests to a web server to access content of a website.

3. The method of claim 2, wherein the web log contains data related to the one or more browser requests to the web server.

4. The method of claim 1, wherein the record without the corresponding cookie data was detached from the other records with corresponding cookie data because the record without the corresponding cookie data was written to the web log without visitor tracking data.

5. The method of claim 4, wherein the visitor tracking data includes visitor identification data used to uniquely identify a browser.

6. The method of claim 5, wherein the visitor identification data includes cookie data generated by a web server.

7. The method of claim 4, wherein the visitor tracking data includes visitor identification data used to uniquely identify a browsing session.

8. The method of claim 1, wherein the detached record is logically related to the other records generated during the same browsing session as the detached record.

9. The method of claim 1, further comprising:
using reattachment criteria and the web log data characteristics of the records to determine that the detached session record is associated with at least one record in the group of session records.

10. The method of claim 9, wherein the reattachment criteria includes similarity of agent, and wherein the web log data characteristics include agent information.

11. The method of claim 9, wherein the reattachment criteria includes similarity of Internet Protocol (IP) address, and wherein the web log data characteristics include an IP address.

12. The method of claim 9, wherein the reattachment criteria includes entry point data, and wherein the web log data characteristics include entry point data.

13. The method of claim 12, wherein the entry point data includes entry to the home page of a website.

14. The method of claim 9, wherein the reattachment criteria includes record time criteria, and wherein the web log data characteristics include record time criteria.

15. The method of claim 9, wherein the reattachment criteria includes similarity of user agent information, similarity of IP address information, entry point data, and record time criteria.

16. The method of claim 15, wherein the web log data characteristics include user agent information, IP address information, entry point data, and record time information.

17. The method of claim 1, wherein the detached session record includes a session referrer, and wherein the detached session record represents a first website that referred a user to a second website.

18. The method of claim 17, wherein the detached session record represents a lost session referrer.

19. The method of claim 18, wherein the lost session referrer contained a banner advertisement that directed the user to the second website.

20. The method of claim 18, wherein the lost session referrer contained a search engine that directed the user to the second website.

21. The method of claim 18, wherein two or more of the session records in the group of session records associated with the particular browsing session contain session referrers that show referrals within the same website.

22. The method of claim 1, wherein the association is used to perform analysis as to where on the internet a web browser was prior to the first request of a particular browsing session in the web log.

23. The method of claim 22, wherein the analysis is used to design a website.

24. The method of claim 22, wherein the analysis is used to pay advertisers that refer users to a website.

25. The method of claim 22, wherein the analysis is used to pay referring websites.

26. The method of claim 22, wherein the analysis is used to structure advertising campaigns involving referring websites.

27. The method of claim 1, wherein a data mining application is used to analyze the browsing activity based upon the association.

28. The method of claim 1, wherein the web log records contain date-time fields, IP address fields, uniform resource identifier (URI) stem fields, cookie fields, referrer fields, and user agent fields.

29. The method of claim 1, further comprising:
grouping the records from the web log by agent data.

30. The method of claim 29, further comprising:
determining whether each record represents an entry page, when a record does not have a visitor identification information; and
placing the record in a visitor identification group based upon the entry point, if the record represents an entry point and if a visitor identification group is within a predetermined timeout threshold.

31. The method of claim 30, further comprising:
assigning a visitor identification to a record by comparing the IP address of the record to the IP addresses of other records within a visitor identification group.

32. A computer-implemented system, comprising:
one or more processors;
one or more computer-readable storage mediums containing software instructions executable on the one or more processors to cause the one or more processors to perform operations including:
generating one or more records during a browsing session, each record having corresponding cookie data;
placing the one or more records and the corresponding cookie data from the browsing session into a web log, wherein cookie data corresponding to at least one record is not placed into the web log;
grouping the one or more records in the web log, wherein each group is associated with cookie data corresponding to records generated during a particular browsing session;
determining that the record without corresponding cookie data was generated during a particular browsing session and has been detached from other records with corresponding cookie data generated during the particular browsing session, wherein the other records form a group of session records associated with the particular browsing session and the detached session record is not included in the group of session records associated with the particular browsing session;
determining that the detached session record is associated with the particular browsing session by comparing a web log data characteristic of the detached session record with a web log data characteristic of at least one record in the group of session records in the web log that are associated with the particular browsing session;

including the detached session record in the group of session records associated with the particular browsing session based upon the comparison; and using the association between the detached session record and the particular browsing session to analyze browsing activity.

33. A computer-readable storage medium encoded with instructions that when executed on one or more processors within a computer system perform a method for analyze browsing activity, the method comprising:

generating one or more records during a browsing session, each record having corresponding cookie data;

placing the one or more records and the corresponding cookie data from the browsing session into a web log, wherein cookie data corresponding to at least one record is not placed into the web log;

grouping the one or more records in the web log, wherein each group is associated with cookie data corresponding to records generated during a particular browsing session;

determining that the record without corresponding cookie data was generated during a particular browsing session and has been detached from other records with corresponding cookie data generated during the particular browsing session, wherein the other records form a group of session records associated with the particular browsing session and the detached session record is not included in the group of session records associated with the particular browsing session;

determining that the detached session record is associated with the particular browsing session by comparing a web log data characteristic of the detached session record with a web log data characteristic of at least one record in the group of session records in the web log that are associated with the particular browsing session;

including the detached session record in the group of session records associated with the particular browsing session based upon the comparison; and using the association between the detached session record and the particular browsing session to analyze browsing activity.

* * * * *